United States Patent
Richmond

(10) Patent No.: US 6,601,857 B1
(45) Date of Patent: Aug. 5, 2003

(54) TOOL HOLDER CLAMP SEAL FOR FLUID COOLED TOOL

(76) Inventor: Daryl E. Richmond, 17623 Marmoset St. NW., Ramsey, MN (US) 55303

( * ) Notice: Subject to any disclaimer, the term of this patent is extended or adjusted under 35 U.S.C. 154(b) by 0 days.

(21) Appl. No.: 09/934,027

(22) Filed: Aug. 21, 2001

(51) Int. Cl.⁷ ............................................... B23B 51/06
(52) U.S. Cl. ..................... 279/20; 277/619; 277/622; 277/910; 408/59
(58) Field of Search ..................... 279/20, 43.9, 46.9, 279/157; 408/56, 57, 59; 409/136; 407/11; 277/619, 622, 910

(56) References Cited

U.S. PATENT DOCUMENTS

| | | | | |
|---|---|---|---|---|
| 3,281,155 A | * | 10/1966 | Kauffman | 277/910 |
| 3,841,644 A | * | 10/1974 | White | 277/468 |
| 5,340,127 A | * | 8/1994 | Martin | 279/20 |
| 5,567,093 A | | 10/1996 | Richmond | 409/136 |
| 5,975,817 A | * | 11/1999 | Komine | 409/136 |
| 5,984,595 A | * | 11/1999 | Mizoguchi | 408/57 |

FOREIGN PATENT DOCUMENTS

EP          445020 A1  *  9/1991  ........... F16K/27/08

* cited by examiner

*Primary Examiner*—Steven C. Bishop
(74) *Attorney, Agent, or Firm*—Kinney & Lange, P.A.

(57) ABSTRACT

A seal assembly for a toolholder with a collet clamping member having a forcing ring in which at least in part the clamping member can be positioned, and a seal ring with a tool insertion opening including a surrounding O-ring holder that can be removably engaged with the forcing ring to place this seal ring in a selected position therein. An O-ring is provided in the seal ring O-ring holder.

11 Claims, 5 Drawing Sheets

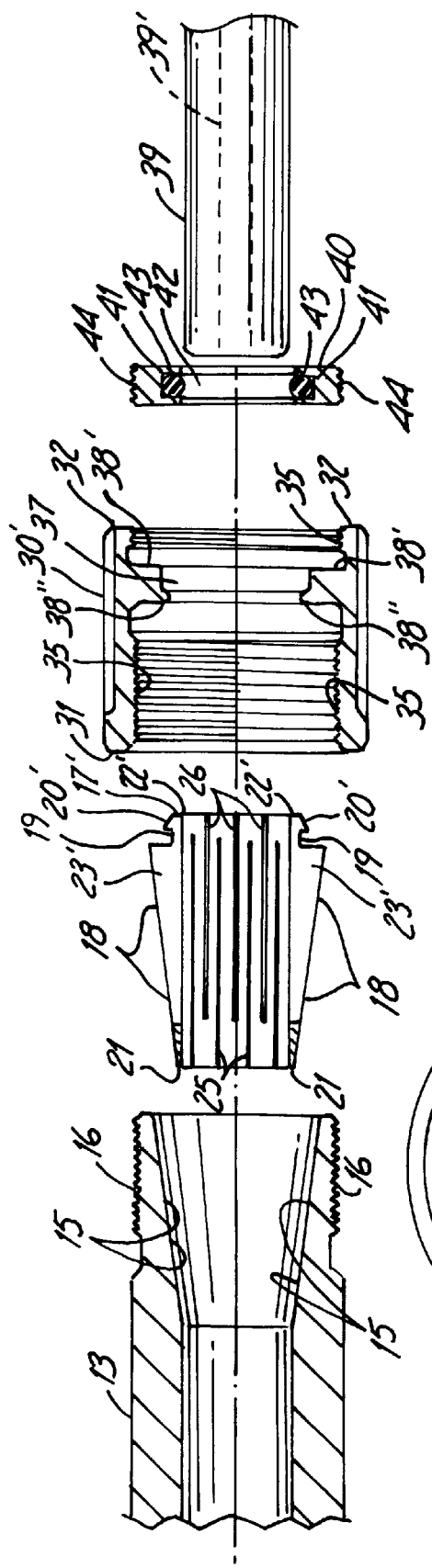
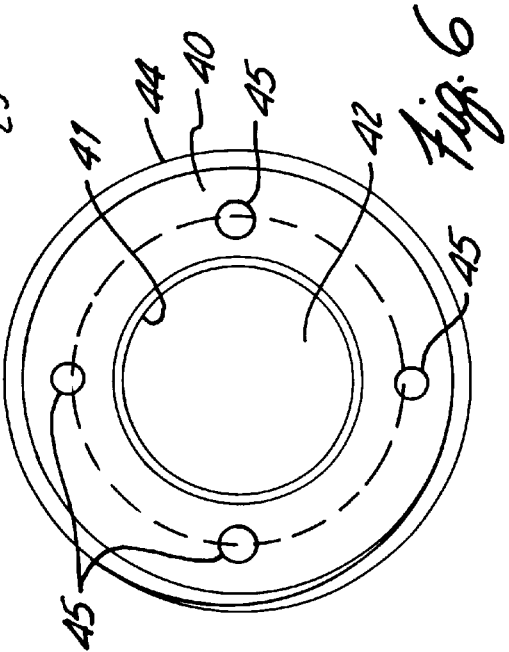

TOOL HOLDER CLAMP SEAL FOR FLUID COOLED TOOL

CROSS-REFERENCE TO RELATED APPLICATION(S)

None

BACKGROUND OF THE INVENTION

The present invention relates to cutting tools such as drills having a liquid as both a coolant and a lubricant supplied to the cutting face of the tool and the material being cut and, more particularly, to liquid flow path restrictions for such tools.

Tools that are used to cut through hard material operate in the presence of large amounts of heat generated thereby and undergo rapid wear of the tool cutting surface in the absence of measures to reduce same. One such measure is to provide a liquid serving as both a coolant and a lubricant at the tool cutting surface where it engages the material being cut. In one such situation, in which a drill is being used to form a hole in a hard material, such a drill can be provided with an interior fluid flow channel to allow transport therethrough of such a liquid under substantial pressure to the interface between the drill and the material thereby allowing that liquid to serve as both a coolant and a lubricant for the drill cutting surface. Such a liquid brought to the drill cutting surface in addition aids in forcing out cut away portions of the material being cut as well as aiding in preventing the drill bit from overheating which can lead to increased tool wear or even breakage.

In such a cutting situation, the liquid pressure may have to be quite large for the liquid to be effective at the tool cutting surface where it meets the material being cut. Liquid pressures from a few hundred pounds per square inch to thousands of pounds per square inch may be needed depending on the particular situation. Fluid confinement in the toolholder at appropriate locations and in the interior fluid flow channel of the tool except at the orifices of that channel where the liquid exits onto the tool cutting surface is necessary if such liquid pressures are to be maintained during operation of the tool. Thus, the pressurized liquid must be confined to flowing with respect to the tool only through the transfer channel and out the orifices thereof in the cutting tool surface, and not along other circumventing paths. That is, the liquid from the pressurized reservoir thereof in the toolholder must flow through the transport channel in the drill and not through other parallel paths to the atmosphere.

One such parallel path for the liquid are leakage paths around the shaft of a drill bit being used as the operating tool. Such leakage has been limited in the past by providing some sort of a seal around the periphery of the drill bit so that fluid reaching the drill shaft from the pressurized reservoir is prevented, at least in large part, from flowing along the sides of the drill. One such seal is shown in U.S. Pat. No. 5,567,093 to the present inventor based on a rigid seal positioned at one end about the drill with an O-ring therebetween, and with the opposite end of the rigid seal being captured between the collet chuck and the collet nut so as to be held by the tightened nut against the collet chuck and the liquid pressure. However, changes in shapes of collets and collet nuts that have previously been commonly used, and increases in liquid pressures being used, can limit the suitability of such a rigid seal. Thus, there is a need for a tool shaft seal system in connection with a toolholder that accommodates various collet chuck shapes and higher liquid pressures for liquids used as a coolant and lubricant at the cutting surface of the tool during operation thereof in cutting materials.

BRIEF SUMMARY OF THE INVENTION

The present invention provides a seal assembly for a toolholder with a collet clamping member about an extended tool placement opening that can be forced radially inward to clamp a tool having a forcing ring in which at least in part the clamping member can be positioned with a seal ring opening positioned adjacent to, and coaxially with, the clamping member with this opening having an inner surface supporting an engager accommodation such as threading. A seal ring with a tool insertion opening including a surrounding O-ring holder has an outer surface supporting an engager, such as threading, that can be removably engaged with the forcing ring engager accommodation in the forcing ring seal ring opening to place this seal ring in a selected position therein. An O-ring is provided in the seal ring O-ring holder. The seal ring has a pair of ends with one of these ends having a pair of holes therein opposite one another across the tool insertion opening.

BRIEF DESCRIPTION OF THE DRAWINGS

FIG. 5 is an exploded side view of the toolholder shown in FIG. 4 and tool including partially cutaway views, and FIG. 6 is an end view of the present invention.

DETAILED DESCRIPTION

Figure 1:
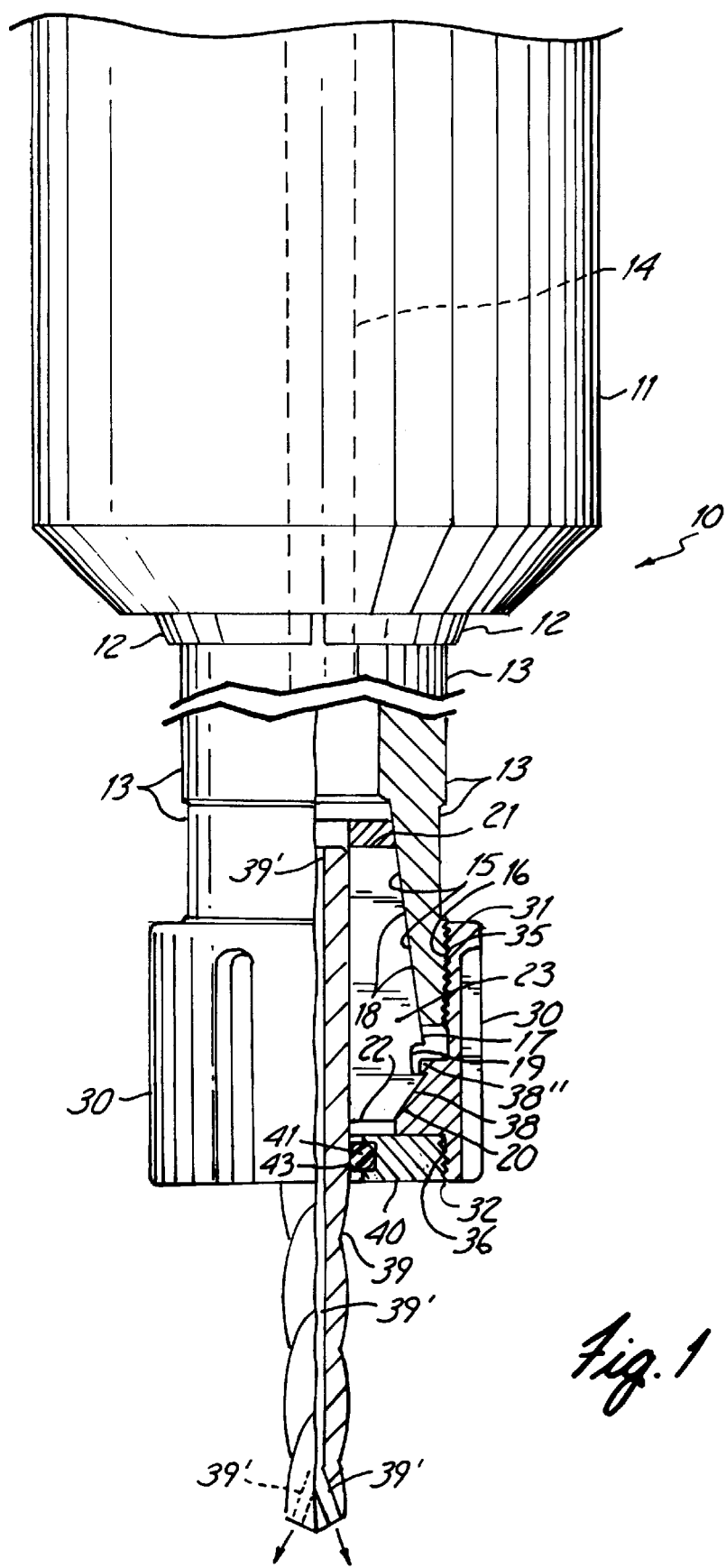
FIG. 1 is a truncated side view including a partially cutaway view of a toolholder arrangement and assembled tool embodying the present invention.

FIG. 1 is a truncated side view, including a partially cutaway view portion, 10, of a toolholder with an assembled tool showing a chuck, 11, with jaws, 12, clamping a toolholder extension, 13, at one end thereof. Chuck 11 has a liquid transport channel, 14, in the interior thereof connected to a reservoir of liquid in the toolholder provided under substantial fluid pressure to serve as a coolant and a lubricant for tools held in, or ultimately held by, this chuck. Such a liquid is thereby present in extension 13 again under this substantial fluid pressure.

Extension 13, at its opposite end, has an interior surface portion, 15, which tapers outwardly from the smallest inner diameter of extension 13 to a largest interior diameter occurring at this very end thereof to thereby have a taper angle with the length axis of symmetry of extension 13. The outside of extension 13 at this same end has a threaded surface, 16, thereabout that is more clearly seen in FIGS. 2 and 3.

Interior tapered surface 15 at the tool end of extension 13 forms a chamber at that end in which a collet chuck, 17, can be inserted so that an outer long tapered surface portion, 18, thereof is closely mated with interior tapered surface 15 of extension 13, i.e. has a taper angle with respect to the length axis of symmetry of collet 17 similar to that of surface portion 15 with respect to the length axis of symmetry of extension 13. Outer long tapered surface 18 of collet 17 ends at a collet nut capture channel, 19, recessed into the outer surface of collet 17 on the other side of which the remainder of the outer surface of collet 17 is formed by a short tapered surface, 20. Outer long tapered surface portion 18, at the end thereof opposite the end thereof adjacent to channel 19, ends at an end, 21, of collet 17, and outer short tapered surface portion 20, at the end thereof opposite the end thereof adjacent to channel 19, ends at a second end, 22, of collet 17.

Outer surface portions 18, 19 and 20 of collet 17 are the outer surface portions of a collet wall structure, 23, which is formed about a tool placement opening, 24, which has a truncated cylinder shape, and opening 24 extends through collet 17 from end 21 to end 22. A set of slots, 25, extend from collet end 21 through collet wall structure 23 for substantial distance toward end 22. Similarly, a set of slots, 26, extend from end 22 through wall structure 23 a substantial portion of the way towards end 21 with slots in this set alternating with those in set 25 around the periphery of collet 17. Thus, a radially directed inward force on outer tapered short wall surface portion 20 of collet 17 causes portions of collet wall 23 to be moved radially inward from an unforced position to being against a tool shaft provided in tool placement opening 24.

Such a radially directed inward force on outer tapered short wall surface portion 20 of collet 17 can be provided by tightening a collet nut, 30, onto the end of extension 13 over collet 17 positioned in the chamber in extension 13 formed by interior tapered surface 15 thereof. Collet nut 30 has an approximately truncated cylindrical outer surface with some depressed portions provided therein to aid in gripping it, and this outer surface extends between a first end, 31, and a second end, 32.

An extension opening, 33, approximating a truncated cylinder extends into collet nut 30 inward from end 31, and a seal ring opening, 34, also approximating a truncated cylinder extends inward into collet nut 30 from end 32 thereof. The inner surface of collet nut 30 about extension opening 33 at end 31 thereof is threaded to provide a threaded interior surface portion, 35, which can mate and engage with the threads on threaded surface 16 at the end of extension 13. The interior surface of collet nut 30 about seal ring opening 34 at end 32 thereof is also threaded to form a threaded interior surface portion, 36.

A clamping structure opening, 37, is provided between extension opening 33 and seal ring opening 34 within collet nut 30 to form a continuous opening therethrough. Clamping structure opening 37 has a tapered interior surface portion, 38, of collet nut 30 thereabout with a taper angle with respect to the length axis of symmetry of collet nut 30 substantially matching that of outer short tapered surface portion 20 of collet 17 with respect to the length axis of symmetry of collet 17. Tapered surface 38 extends between a circular shoulder, 38', formed at the interior end of seal ring opening 34 and a circular opening constriction ridge, 38", formed at the interior end of extension opening 33. Circular opening constriction ridge 38" fits in collet nut capture channel 19 of collet 17 when mated therewith in mounting a tool in extension 13. Alternatively, rather than being formed as part of collet nut 30, tapered interior surface portion 38 and circular shoulder 38' can be provided by a tapered opening ring and held in an extension of extension opening 33 in collet nut 30 by a snap ring also serving as circular opening constriction ridge 38".

Thus, when collet 17 is in the end of extension 13 and collet nut 30 has the threaded surface 35 thereof engaged with threaded surface 16 of extension 13 sufficiently, tapered interior surface 38 of collet nut 30 is forced against outer short tapered surface portion 20 of collet 17, and tapered interior surface 15 of extension 13 is forced against outer long tapered surface portion 18 of collet 17, to thereby force wall structure 23 at tapered surface portion 20 inward so as to clamp a tool shaft provided in tool placement opening 24 of collet 17. An example of such a tool shaft is shown provided as part of a drill, 39, having a liquid transport channel, 39', therein extending through the length thereof.

A seal ring, 40, has an O-ring channel, 41, formed therein about a tool insertion opening, 42, otherwise shaped as a truncated cylinder. An O-ring, 43, is shown positioned in channel 41 in FIGS. 1 and 3 but outside of ring 40 in FIG. 2. The exterior surface otherwise approximating a truncated cylinder of seal ring 40 is threaded to form a threaded surface, 44, that can mate with threaded surface 36 of collet nut 30 so as to be rotatable therein to a position against shoulder 38' in collet nut 30.

As a result, in the mounted tool assembly shown in FIG. 1, pressurized liquid provided in extension 13 is also at the base of the shaft portion of drill 39 from which it flows through drill liquid transport channel 39'. The pressurized liquid is also forced through the slots in collet 17, and about collet 17, into collet nut 30 but is prevented from leaving collet nut 30 at end 31 thereof by the mating of threaded surface 35 of that collet nut and threaded surface 16 of extension 13. The pressurized liquid is also prevented from flowing through seal ring opening 34 of collet nut 30 by the mating of threaded surface 36 of collet nut 30 with threaded surface 44 of seal ring 40. Finally, the pressurized liquid is prevented from flowing along the sides of drill shaft 39 by tightly fitted O-ring 43 held thereagainst by sealing ring 40.

Collet nuts and extensions are formed of high quality steel and have substantial wall thicknesses to withstand high torques thereon occurring during tightening one on the other, and therefore can withstand large internal fluid pressures. Seal ring 40, having a substantial thickness, is also well able to withstand the liquid pressures encountered as is its threaded mating with collet nut 30.

Figure 4:
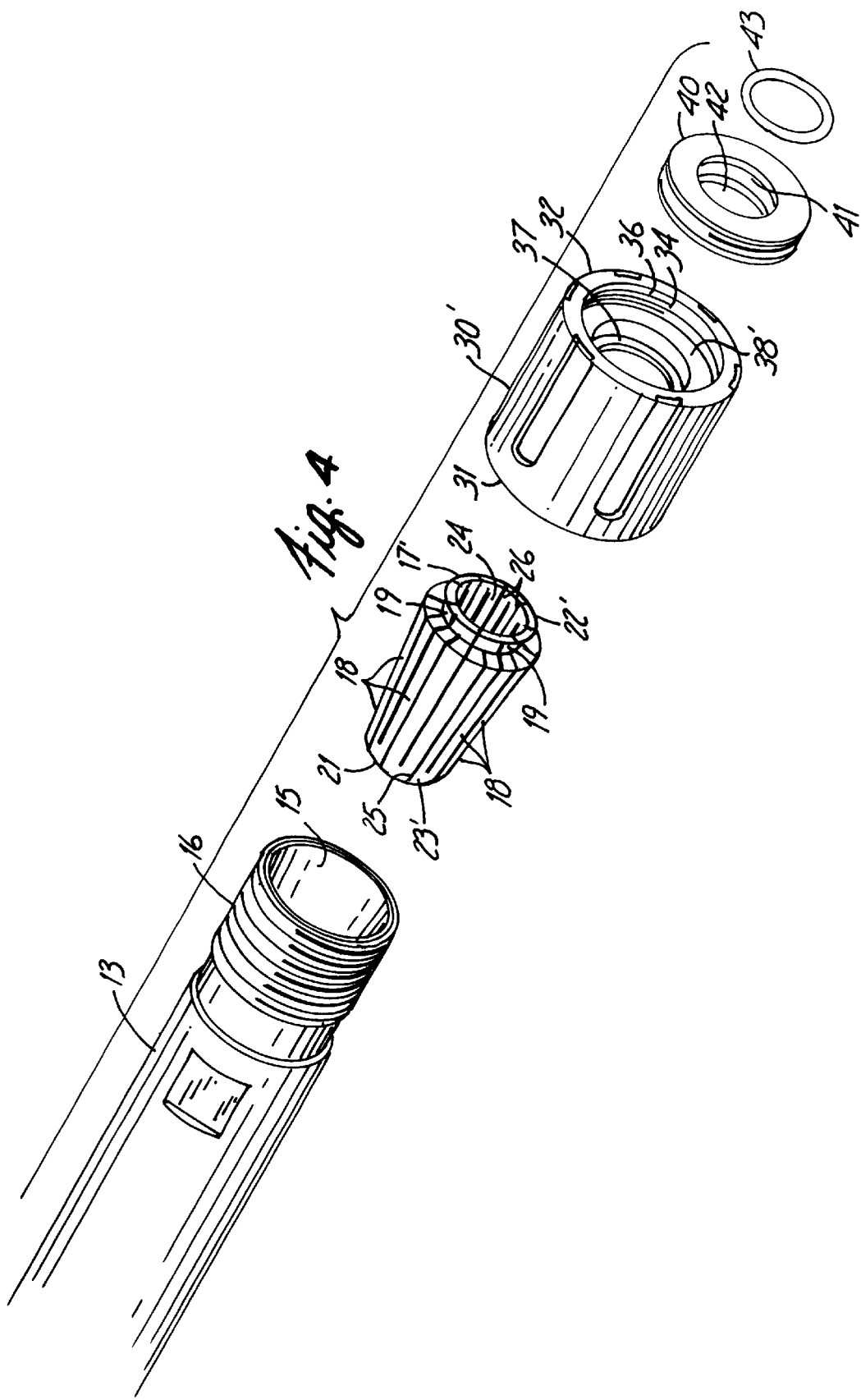
FIG. 4 is an exploded perspective view of an alternative toolholder embodying the present invention.

A newer geometric form for the collet chuck and corresponding collet nut is shown in the exploded perspective view of an alternative toolholder of FIG. 4 and the exploded side view thereof shown in FIG. 5 again with the shaft of a drill shown as the tool to be held. This collet chuck, 17', again has outer long tapered surface portion 18 extending between collet end 21 and circumferential collet nut capture channel 19 recessed into the outer surface of collet 17'. However, a much shorter outer short tapered surface portion, 20', extends between channel 19 and the remaining collet end, 22'. The correspondingly changed wall structure, 23', however still has slot sets 25 and 26 therein as formed about tool placement opening 24.

Because of the geometry changes in collet chuck 17' from the geometry of collet chuck 17, a changed collet nut, 30', is correspondingly provided as shown in FIGS. 4 and 5. Collet nut 30' again has extension opening 33 with threaded interior surface portion 35 thereabout extending into collet nut 30 inward from end 31, and seal ring opening 34 with threaded interior surface portion 35 thereabout extending inward into collet nut 30 from end 32 thereof. However, clamping structure opening 37 between extension opening 33 and seal ring opening 34 now has no significant tapered interior surface portion 38 thereabout extending between circular shoulder 38' and circular opening constriction ridge 38" which instead are immediately adjacent one another in collet nut 30'.

Figure 2:
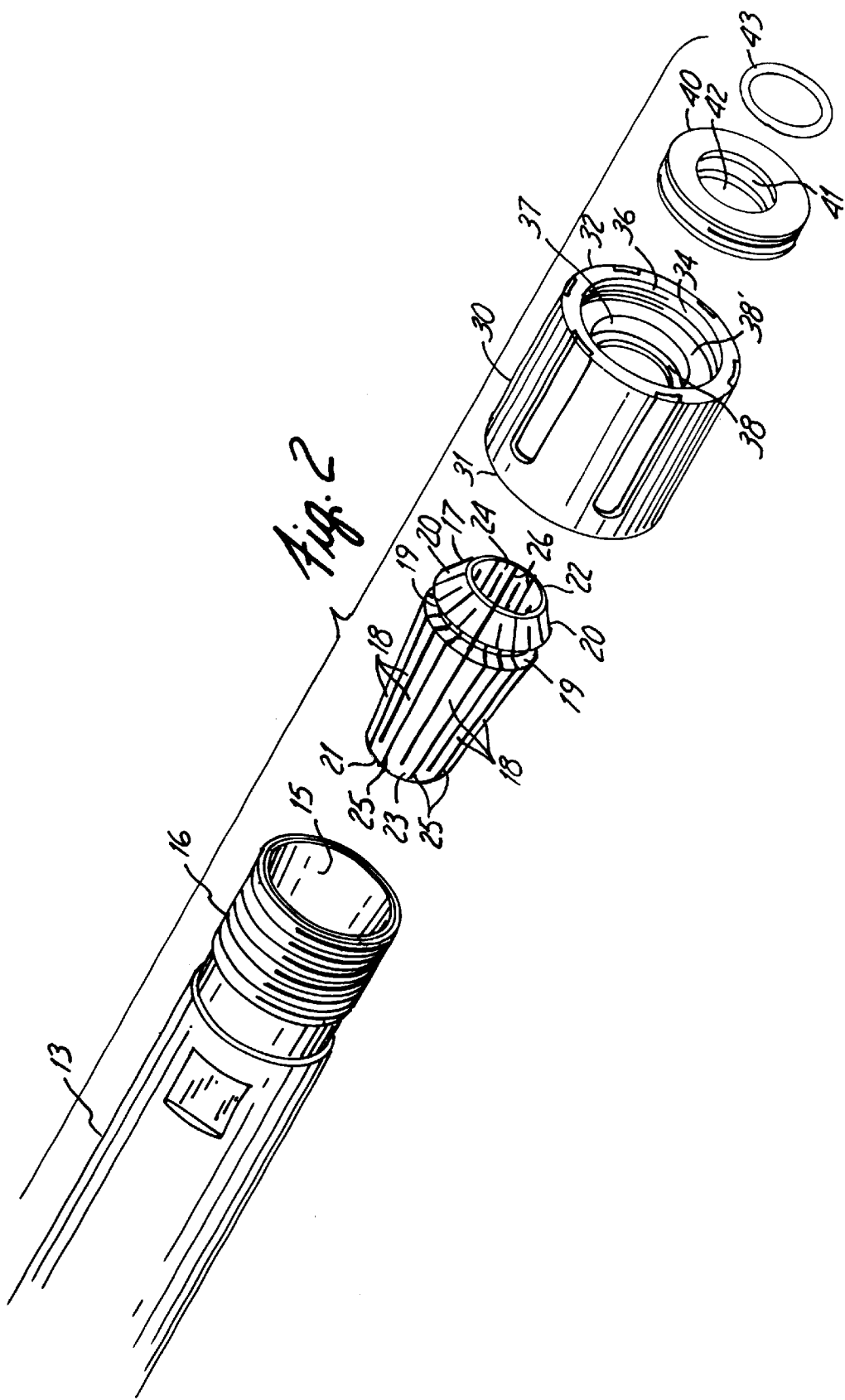
FIG. 2 is an exploded perspective view of the toolholder shown in FIG. 1.
Figure 3:
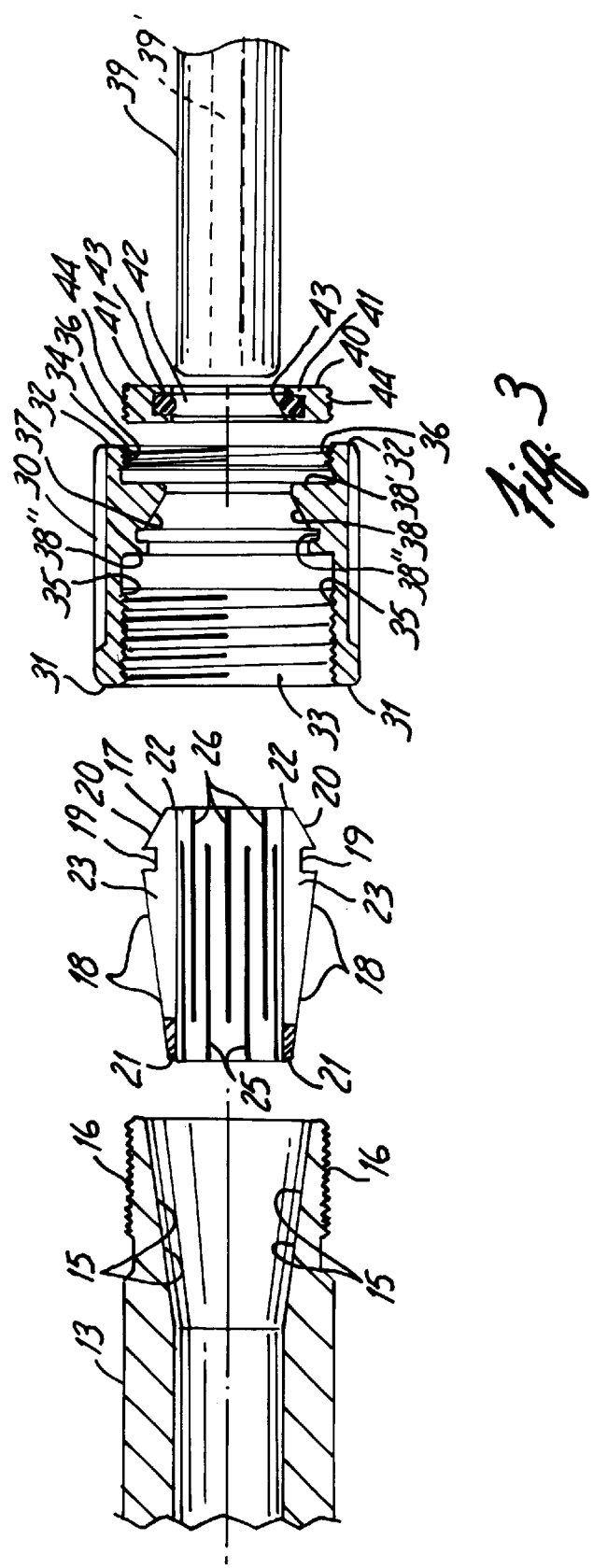
FIG. 3 is an exploded side view of the toolholder shown in FIG. 1 and tool including partially cutaway views.

In tightening collet nut 30 onto collet 17 above in FIGS. 1, 2 and 3, tapered interior surface 38 of collet nut 30 is forced against outer short tapered 5 surface portion 20 of collet 17 but can come against it off center to leave collet 17 with tool 39 canted off center. However, tightening collet nut 30' onto collet 17' here results in the left side of channel 19 of collet 17' being forced against circular shoulder 38' so that the centerline of collet 17' must align with the centerline of collet nut 30', i.e. without any canting.

The same seal ring 40 and O-ring 43 used with collet nut 30 above can be used with collet nut 30' here so that threaded surface 44 can be mated with threaded surface 36 of collet nut 30' so as to be rotatable therein to a position against shoulder 38' in collet nut 30'. Pressurized liquid can again be provided in extension 13 to the base of the shaft portion of drill 39 from which it flows through drill liquid transport channel 39', and through the slots in collet 17' and around collet 17' into collet nut 30' but is prevented from leaving collet nut 30' by the mating of threaded surfaces with extension 13 and seal ring 40. Again, the pressurized liquid is prevented from flowing along the sides of drill shaft 39 by tightly fitted O-ring 43 held thereagainst by sealing ring 40. The high quality steel and substantial wall thicknesses of extension 13, collet nut 30' and seal ring 40 are well able to withstand the liquid pressures encountered.

An end view of seal ring 40 is shown in FIG. 6. There can be seen four small recessed holes, 45, symmetrically around tool insertion opening 42 on a common position placement circle of a radius larger than that of opening 42. Pairs of holes 45 are across from one another on a diameter of that common position placement circle. Holes 45 are of a sufficient diameter to accept therein bosses on a spanner wrench to allow tightening of seal ring 40 in seal ring opening 34 of either of collet nuts 30 or 30' against shoulder 38' at the bottom of those openings to assure pressurized liquid does not flow past seal ring 40 where mated with a collet nut.

Although the present invention has been described with reference to preferred embodiments, workers skilled in the art will recognize that changes may be made in form and detail without departing from the spirit and scope of the invention.

What is claimed is:

1. A seal assembly for a toolholder having a clamp member with clamping structures positioned about an extended tool placement opening therein such that said clamping structures can be forced radially inward a selected distance from a selected initial position, said seal assembly comprising:

a forcing ring extending about a clamping structures opening in which at least in part said clamping structures can be positioned, and also extending about a seal ring opening positioned adjacent to, and coaxially with, said clamping structures opening but separated therefrom by a shoulder structure in said forcing ring extending about a shoulder opening therein positioned coaxially with said clamping structures and seal ring openings though smaller than said seal ring opening, said forcing ring having therein a forcing ring engager accommodation about said seal ring opening;

a seal ring extending about a tool insertion opening therein including an O-ring holder surrounding said tool insertion opening, said seal ring having therein a seal ring engager provided thereabout across from said O-ring holder such that said seal ring engager, without having to reposition said forcing ring, can be removably engaged with said forcing ring engager accommodation in said forcing ring seal ring opening to place said seal ring in a selected axial position therein including positioned against said shoulder structure; and an O-ring positioned in said seal ring O-ring holder about said seal ring tool insertion opening.

2. The apparatus of claim 1 wherein said clamp is a collet chuck in which said tool placement opening is shaped as a truncated cylinder having a collet wall structure thereabout with two ends between which an outer surface thereof extends with a taper therealong over at least some part of that extent, said collet wall structure having slots extending therethrough from each of said ends with said slots extending from one of said ends circumferentially alternating with those said slots extending from that other said end along at least some peripheral portion of said collet wall structure.

3. The apparatus of claim 1 wherein said forcing ring is a collet nut with a pair of ends and having an interior threaded surface adjacent a said end thereof opposite that said end thereof nearest to said seal ring opening.

4. The apparatus of claim 1 wherein said seal ring has a pair of ends with one of said ends having a pair of holes therein opposite one another across said tool insertion opening.

5. The apparatus of claim 1 wherein said seal ring engager and said forcing ring engager accommodation are each compatible threads as part of corresponding threaded surfaces so that said seal ring may be removably placed in said forcing ring seal ring opening and rotated therein to a selected position to thereby engage one another.

6. The apparatus of claim 3 further comprising an extension with an opening therein in which at least a portion of said clamp can be positioned, and having a threaded surface thereabout which can be engaged with said collet nut interior threaded surface.

7. The apparatus of claim 5 wherein said seal ring has a pair of ends with one of said ends having a pair of holes therein opposite one another across said tool insertion opening.

8. A seal assembly for a toolholder having a clamping means such that said clamping means can be forced radially inward against a selected tool, said seal assembly comprising:

a nut means extending about a clamping opening, in which at least in part said clamping means can be positioned, and also extending about a seal ring opening separated from said clamping opening by a shoulder means in said nut means with said nut means having a nut engager means provided about said seal ring opening;

a seal ring means extending about a tool insertion opening therein including an O-ring holder means surrounding said tool insertion opening, said seal ring means having a seal ring engager means, without having to reposition said nut means, can be removably engaged with said nut engager means in said nut seal ring opening to place said seal ring means in a selected position therein including positioned against said shoulder means; and a flexible O-ring means positioned in said seal ring O-ring holder means about said seal ring tool insertion opening.

9. The apparatus of claim 8 further comprising an extension means with an opening therein in which at least a portion of said clamping means can be positioned, and having a threaded surface thereabout which can be engaged with interior threaded surface of said nut means about said clamping opening.

10. The apparatus of claim 8 wherein said seal ring means has a pair of ends with one of said ends having a seal ring tightener means therein allowing the engagement thereof with a corresponding tightening tool.

11. A seal assembly for a toolholder having a collet chuck, said seal assembly comprising:

a collet nut extending about a collet opening in which at least in part said collet can be positioned, and also extending about a seal ring opening positioned adjacent to, and coaxially with, said collet opening but separated therefrom by a shoulder in said collet nut extending about a shoulder opening coaxial with said collet and seal ring opening though smaller than said seal ring opening, said collet nut having a threaded surface about said seal ring opening;

a seal ring extending about a tool insertion opening therein including an O-ring holder surrounding said tool insertion opening, said seal ring having a threaded outer surface such that said seal ring, without having to reposition said collet nut, can be removably threaded into sail collet nut seal ring opening to place said seal ring in a selected position therein including against said shoulder; and an O-ring positioned in said seal ring O-ring holder about said seal ring toot insertion opening.

* * * * *